United States Patent [19]

Best et al.

[11] Patent Number: 5,500,848
[45] Date of Patent: Mar. 19, 1996

[54] SECTOR SERVO DATA RECORDING DISK HAVING DATA REGIONS WITHOUT IDENTIFICATION (ID) FIELDS

[75] Inventors: John S. Best, San Jose; Steven R. Hetzler, Sunnyvale, both of Calif.

[73] Assignee: International Business Machines Corporation, Armonk, N.Y.

[21] Appl. No.: 82,826

[22] Filed: Jun. 23, 1993

Related U.S. Application Data

[63] Continuation of Ser. No. 727,680, Jul. 10, 1991, abandoned.

[51] Int. Cl.$^6$ .............................. G11B 5/76; G11B 5/09
[52] U.S. Cl. ........................ 369/275.3; 369/59; 360/48
[58] Field of Search ................ 360/47, 48, 77.05, 360/77.08, 78.04, 78.14, 135, 77.02, 49, 54, 61, 50, 27, 53; 369/32, 59, 275.3, 13, 47, 48, 49, 54, 58

[56] References Cited

U.S. PATENT DOCUMENTS

| | | | |
|---|---|---|---|
| 4,513,392 | 4/1985 | Shenk | 364/900 |
| 4,527,273 | 7/1985 | Hibi et al. | 371/38 |
| 4,631,723 | 12/1986 | Rathbun et al. | 360/47 |
| 4,656,532 | 4/1987 | Greenberg et al. | 360/48 |
| 4,677,606 | 6/1987 | Ogata et al. | 369/59 |
| 4,775,969 | 10/1988 | Osterlund | 369/59 |
| 4,791,622 | 12/1988 | Clay et al. | 369/59 |
| 4,791,623 | 12/1988 | Deiotte | 369/59 |
| 4,792,936 | 12/1988 | Picard | 369/59 |
| 4,811,124 | 3/1989 | Dujari et al. | 360/49 |
| 4,814,903 | 3/1989 | Kulakowski et al. | 360/48 |
| 4,827,462 | 5/1989 | Flannagan et al. | 369/32 |
| 4,839,878 | 6/1989 | Inoue | 369/54 |
| 4,862,295 | 8/1989 | Tanaka et al. | 369/59 |
| 4,914,529 | 4/1990 | Bonke | 360/48 |
| 4,914,530 | 4/1990 | Graham et al. | 360/48 |
| 4,953,122 | 8/1990 | Williams | 369/59 |
| 4,972,316 | 11/1990 | Dixon et al. | 364/200 |
| 5,034,914 | 7/1991 | Osterlund | 369/32 |
| 5,036,408 | 7/1991 | Leis et al. | 360/48 |
| 5,050,016 | 9/1991 | Squires | 360/77.08 |
| 5,070,421 | 12/1991 | Sumiya et al. | 360/77.07 |
| 5,073,834 | 12/1991 | Best et al. | 360/77.08 |
| 5,105,416 | 4/1992 | Segawa | 369/59 |
| 5,121,280 | 6/1992 | King | 360/135 |
| 5,130,969 | 7/1992 | Sako | 369/59 |
| 5,136,564 | 8/1992 | Tobita | 369/44.13 |
| 5,172,352 | 12/1992 | Kobayashi | 369/44.26 |
| 5,193,034 | 3/1993 | Tsuyoshi et al. | 360/51 |
| 5,196,970 | 3/1993 | Seko et al. | 360/77.03 |
| 5,202,799 | 4/1993 | Hetzler et al. | 360/48 |
| 5,210,660 | 5/1993 | Hetzler | 360/51 |
| 5,212,677 | 5/1993 | Shimote et al. | 369/58 |
| 5,237,553 | 8/1993 | Fukushima et al. | 369/58 |
| 5,271,018 | 12/1993 | Chan | 371/10.2 |
| 5,278,703 | 1/1994 | Rub et al. | 360/51 |

FOREIGN PATENT DOCUMENTS

| | | | |
|---|---|---|---|
| 0347032 | 12/1989 | European Pat. Off. | |
| 0402912 | 12/1990 | European Pat. Off. | |
| 0420211 | 4/1991 | European Pat. Off. | |
| 60-121574 | 6/1985 | Japan | |
| 63-004327 | 1/1988 | Japan | |
| 63-70928 | 3/1988 | Japan | 369/275.3 |
| 01178172 | 7/1989 | Japan | |

OTHER PUBLICATIONS

R. A. Peterson, et al., IBM Technical Disclosure Bulletin, vol. 28, No. 7, pp. 3001–3002, Dec., 1985.

*Primary Examiner*—Ali Neyzari
*Attorney, Agent, or Firm*—Thomas R. Berthold; David J. Kappos

[57] ABSTRACT

A data recording disk file with a fixed block architecture sector format that eliminates the ID region. The servo region contains sector identification information in the form of a start-of-track indicating mark recorded in a selected sector of each track and a start-of-sector indicating mark recorded in each sector. A full track number identifier is encoded in the position field within the servo region of each sector. A look-up table is built at format time to map bad sectors out of the disk file. The table contains entries for each cluster of contiguous bad sectors, and is searched at runtime to provide conversion of logical sector location identifiers to physical sector location identifiers.

15 Claims, 4 Drawing Sheets

NO-ID SECTOR SERVO SECTOR FORMAT

FIG. 1A: PRIOR ART SECTOR SERVO SECTOR FORMAT

FIG. 1B: PRIOR ART DEDICATED SERVO SECTOR FORMAT

| Bad Sector List | | | | | | | |
|---|---|---|---|---|---|---|---|
| Physical Sector | 3 | 5 | 6 | 9 | 10 | 11 | 13 |
| Logical to Physical Mapping | | | | | | | |
| Logical Sector | 1 | 2 | 3 | 4 | 5 | 6 | 7 |
| Physical Sector | 1 | 2 | 4 | 7 | 8 | 12 | 14 |
| Look-up Table | | | | | | | |
| Logical Sector | 3 | 4 | 6 | 7 | | | |
| Offset | 1 | 3 | 6 | 7 | | | |

FIG. 3: EXAMPLE OF LOOK-UP TABLE CREATION

FIG. 2A:

NO-ID SECTOR SERVO SECTOR FORMAT

FIG. 2B:

NO-ID DEDICATED SERVO SECTOR FORMAT

```
static int tl[MAXBAD];                          /*lookup table: logical #*/
static int to[MAXBAD];                          /*lookup table: offset*/
static int nt = 0;                              /*number table entries*/ void build(b,nbad)                              /*build bad sector table*/
int b[MAXBAD];                                  /*physical bad sectors*/
int nbad;                                       /*number of bad sectors found*/
{
  int bad;

bad = 0;                                      /*bad sector counter*/
  nt = 0;                                       /*table index counter*/ tl[nt] = b[bad];                              /*first entry*/
  to[nt] = 1;                                   /*offset starts at 1*/
  bad++;                                        /*next bad sector*/
  while (b[bad] == b[bad-1]+1) {                /*while adjacent sectors*/
    to[nt]++;                                   /*increment offset*/
    bad++;                                      /*next sector*/
  } while (bad < nbad) {
    nt++;                                       /*next table entry*/
    tl[nt] = b[bad] - to[nt-1];                 /*will be next entry*/
    to[nt] = to[nt-1] + 1;                      /*starting offset*/
    bad++;                                      /*next bad sector*/
    if (bad == nbad) break;                     /*end of the list*/
    while (b[bad] == b[bad-1]+1) {              /*while adjacent sectors*/
      to[nt]++;                                 /*increment offset*/
      bad++;                                    /*next sector*/
      if (bad == nbad) break;                   /*end of the list*/
    }
  }
  nt++;                                         /*nt is now # elements*/
  if ((nt & 1) == 0) {                          /*table should be odd*/
    tl[nt] = 32767;                             /*max allowed value*/
    nt++;
  }
} /* build */
```

FIG. 4: Look-up Table Generation Algorithm in C.

FIG. 5: Logical-to-Physical Sector Conversion Algorithm s
SECTOR SERVO DATA RECORDING DISK HAVING DATA REGIONS WITHOUT IDENTIFICATION (ID) FIELDS This is a continuation of application Ser. No. 07/727,680, filed Jul. 10, 1991, now abandoned.

This invention relates in general to data recording disk drives, and in particular to sector formats on multiple-track data storage media used in fixed block architecture disk drives.

BACKGROUND OF THE INVENTION

All disk drives require some means of determining the radial position of the READ-WRITE heads over the disks so that the heads can be accurately positioned over any desired track. Typically this is accomplished by placing servo information on one or more of the disk surfaces for reading by magnetic or optical heads. Some disk drives, known as dedicated servo drives, contain servo information only on a dedicated surface of one disk in the disk stack. In contrast, some modern drives, known as sector servo drives, store the servo information interspersed with the data on each disk surface. This latter approach represents the direction in which the technology is progressing and is preferred because it can be implemented at low cost and without additional componentry beyond that required to store the data and further because it provides the servo information at the data surface being accessed, thereby eliminating many mechanical and thermal sources of track misregistration. Fixed block architecture (FBA) is a common configuration used to format both dedicated servo disk drives and sector servo disk drives. In an FBA formatted disk drive, each disk track is divided into a number of equal-sized sectors, and each sector is divided into regions containing servo information, identification information (ID), and data.

Figure 1A:
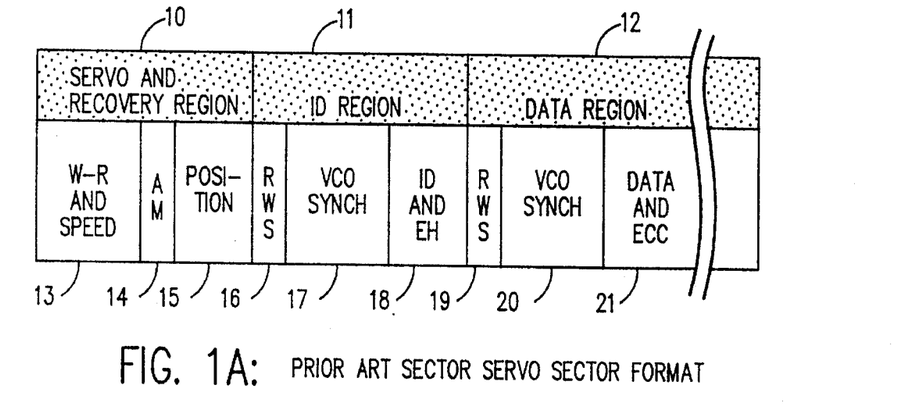
FIG. 1A is a schematic diagram illustrating a fixed block architecture sector servo sector fore, at according to the prior art.

A typical FBA sector servo sector format according to the prior art is illustrated in FIG. 1A. The sector is divided into three regions: servo and recovery region 10, ID region 11 and data region 12. Generally, servo and recovery region 10 contains overhead associated with sectoring, as well as servo information for sector servo drives. Also, this region marks the beginning of the sector. Specifically, servo region 10 contains WRITE-to-READ recovery (W-R) and speed compensation field 13, which is used to switch the data channel from WRITE to READ and accommodate spindle speed variations; address mark (AM) field 14; and servo position field 15 containing a position-error-signal (PES). Data region 12 contains the user data, as well as overhead fields. READ-to-WRITE recovery (R-W) and speed field 19 performs a function like that of W-R and speed field 13. Voltage controlled oscillator sync (VCO) field 20 is used to synchronize the read clock with the read data. Data field 21 contains the user data and associated error checking and correction (ECC) information. ID region 11 is used by the disk data controller (DDC) to identify the physical sector number. It contains R-W and speed field 16, VCO synch field 17 and identification/error handling (ID/EH) field 18, which contains the identification information including the logical sector number.

Figure 1B:
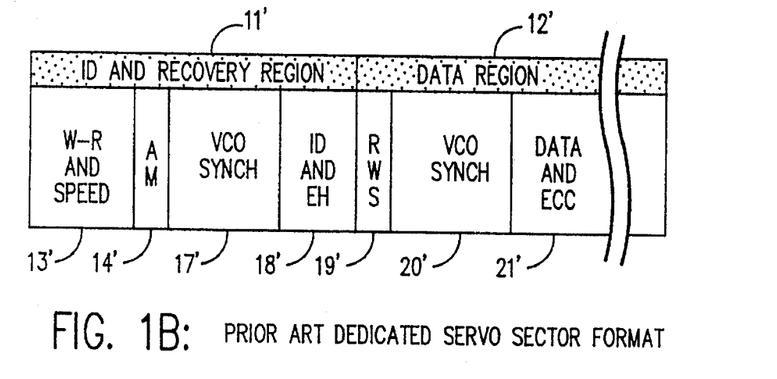
FIG. 1B is a schematic diagram illustrating a fixed block architecture dedicated servo sector format according to the prior art.

A typical FBA dedicated servo sector format according to the prior art is illustrated in FIG. 1B. The data disk sector shown is divided into two regions: ID and recovery region 11' and data region 12'. ID and recovery region 11' contains substantially the same information as servo and recovery region 10 and ID region 11 of FIG. 1A, with the exception that servo position field 15 and R-W and speed field 16 are removed. In a dedicated servo scheme, servo position field 15 is not needed because the position information is contained on a separate surface; R-W and speed field 16 is not needed because address mark field 14' can be written whenever the succeeding VCO synch field 17' and ID/EH field 18' are written. Data region 12' contains substantially the same information as data region 12 of FIG. 1A.

ID regions 11 and ID and recovery region 11' of the prior art FBA sector formats perform two important functions. First, they uniquely identify the logical sector number of the sector in which they are located. Second, they indicate whether the sector is good or bad (that is, whether the sector can be successfully written to and read from). Unfortunately, in both the dedicated servo and sector servo scheme, the ID region requires a great deal of disk space to perform its functions. Since the disk uses the information in the ID region to perform a logical-to-physical sector conversion in order to locate the physical position on the disk corresponding to the requested logical sector, the ID region must be large enough to avoid misidentifying sectors. Furthermore, since a phase synchronous clock is typically used to read the ID/EH field, the VCO field is required; this field is typically much larger than the ID/EH field. Finally, in the sector servo scheme, due to the region transition an R-W and speed field is required to switch the data channel from READ to WRITE and accommodate spindle speed variations.

In sum, due to overhead and accuracy requirements, the ID region of the prior art FBA sector accounts for a substantial portion of the overall sector length (typically about 4%), a portion that could otherwise be used for data storage. However, the importance of its two functions has hampered efforts to eliminate it from the FBA sector.

One approach that has been used to eliminate the ID region is to encode the ID information into the data field. This eliminates the overhead associated with synching (fields 16 and 17), and allows the ECC to provide error checking for the ID information. However, it does not eliminate or reduce the actual ID information as contained in ID/EH field 18. Also, it adds a minimum of one sector time to the latency during WRITE, since the disk drive controller cannot determine the good/bad sector relationship until it has read at least one sector. Further, this scheme is not well suited to compact and low-cost disk drives, where the error correction time is typically quite long, since it means a revolution may be lost in the case of a sector where any bit is bad in the entire field containing the combined ID and data. Thus, while the approach of combining the ID and data regions reduces the disk space required for ID information, this approach introduces performance penalties that restrict its usefulness.

OBJECTS OF THE INVENTION

It is therefore an object of the present invention to provide a data recording disk drive having a sector format that eliminates the need for an ID region.

It is another object of the present invention to provide a data recording disk drive having a sector format that uniquely identifies each track and each sector of a multiple track data storage medium.

It is another object of the present invention to provide a data recording disk drive having a sector format that includes information encoded in the servo region of a sector to uniquely identify the sector.

It is another object of the present invention to provide a data recording disk drive having a table for cataloging and mapping around bad sectors caused by media defects.

These and other objects will become more apparent when read in light of the following specification and drawings.

SUMMARY OF THE INVENTION

In accordance with the invention, a data recording disk drive is provided with an FBA sector architecture that eliminates the ID region while preserving its function. For disk drives implementing a sector servo scheme, the position field in the servo region of each sector is expanded to include a full track number identifier. For disk drives implementing a dedicated servo scheme, a track field is created in the servo region of each sector to include a full track number identifier. In either scheme, this enables the DDC to verify the full physical track number. The function performed by the ID/EH field is moved to the servo region in the form of a start-of-track indicating mark recorded in a selected sector of each track and a start-of-sector indicating mark recorded in each sector. The disk drive uniquely identifies a requested sector by detecting the start-of-track indicating mark and then counting start-of-sector marks to the appropriate sector.

Bad sectors are mapped out of the disk drive by means of a look-up table. At disk format time, each sector is written to and read from to determine whether it is operable or defective. Clusters of defective sectors are marked bad by recording in the look-up table the sector location identifier of the first bad sector in the cluster and the quantity of consecutive bad sectors in the cluster. During operation, the disk drive performs logical-to-physical sector conversion by searching the look-up table for an entry having a value less than or equal to the requested logical sector location identifier. If none is found, the physical sector location identifier is equal to the logical sector location identifier. If an entry is found, an offset representing the quantity of consecutive bad sectors associated with the entry is added to the logical sector location identifier to produce the physical sector location identifier. Then the physical sector location identifier is convened into an actual head, track and sector location, which is accessed by counting start-of-sector marks after a start-of-track mark on the appropriate track.

DETAILED DESCRIPTION OF THE INVENTION

IA. NO-ID FBA SECTOR SERVO SECTOR FORMAT

Figure 2A:
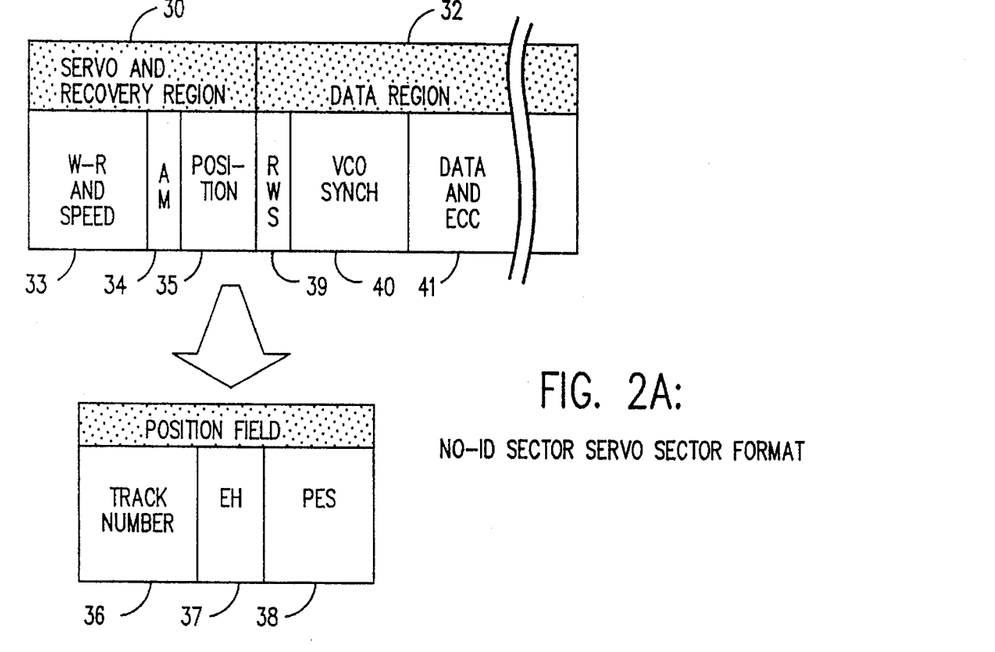
FIG. 2A is a schematic diagram illustrating a fixed block architecture sector servo sector format according to the present invention.

FIG. 2A illustrates in schematic diagram form an FBA sector servo sector according to the present invention. Servo and recovery region 30 includes W-R and speed field 33, AM field 34 and position field 35. Position field 35 itself includes track number subfield 36, EH subfield 37 and PES subfield 38. Data region 32 includes R-W and speed field 39, VCO synch field 40 and data field 41.

In operation, fields 33, 34, 39, 40 and 41 provide substantially the same functions as fields 13, 14, 19, 20 and 21 shown in prior an FIG. 1A and described previously. Fields 16, 17 and 18 from prior art FIG. 1A are eliminated.

Position field 35 is expanded over position field 15 of the prior art, as shown in the lower portion of FIG. 2A. According to the preferred embodiment of the present invention, the full track number corresponding to the track on which the sector is located is recorded in track number subfield 36. EH subfield 37 is provided as an adjunct to the full track number to ensure that the track number has been read correctly. Finally, the actual position-error-signal is encoded in PES subfield 38. This subfield contains substantially the same information as position field 15 of prior art FIG. 1A.

It is to be noted that both the full track number and the EH information may be recorded according to any of a variety of techniques well know to those skilled in the art of data recording disk sector formats. For instance, a gray code may be used to record the full track number because it allows the full track number to be accurately read when the disk head is off-track. The EH information may implement any of a variety of schemes well known to those skilled in the an, including error checking and correction (ECC) codes and cyclic redundancy check (CRC) codes. According to the preferred embodiment of the present invention, EH subfield 37 is implemented using CRC, an error-check-only code. CRC is chosen because it is easy to compute and because it requires a small number of bits (roughly 16). Since CRC bits will not form a gray code, EH subfield 27 is implemented in a code that is accurately readable only when the head is on track. This implementation has no adverse impact on the present invention, since an absolutely accurate reading of the track number subfield is required only when the head is already on-track.

The no-id sector format of the present invention provides several space saving advantages over the prior art. The track number need not be redundantly encoded in an ID region but instead is communicated to the DDC by the servo system at runtime. Track number subfield 36 and EH subfield 37 are substantially shorter than ID region 11 shown in prior art FIG. 1A, since the FBA format of the present invention is able to use CRC rather than other forms of ECC and since the maximum track number is one or two orders of magnitude smaller than the maximum sector number encoded in prior art ID/EH field 18. Since fewer bits are required to represent the track number, this quantity may be recorded at lower density, so that track number subfield 36 and EH subfield 37 can be read without a phase synchronous clock; therefore VCO synch field 17 is not required. Finally, since no separate ID region is set up, R-W and speed field 16 is eliminated.

As discussed above, the preferred embodiment of the present invention contemplates the use of a full track number in track number subfield 36 in order to provide absolute identification of the track number for READ and WRITE operations. However, it is to be understood that the track number may be encoded according to a variety of alternative schemes. For instance, PES subfield 38 may itself assume the form of a pattern which is unique over a range of tracks, and may be used to construct the LSBs of the track number. Thus, if the PES pattern repeats every four tracks, it may be used to provide the two LSBs of the track number. Or the MSBs of the track number may be omitted altogether, and the servo electronics depended on to determine which half (or quarter, or eighth) of the disk the head is positioned over.

The application of the present invention to sector servo disk drives has been described with reference to the sector servo sector format shown in FIG. 2A. However, it should be noted that the present invention may be applied to any sector servo format in which the track number may be encoded in the servo and recovery region. For example, instead of a fixed special relationship between the servo regions and data regions, a sector servo format may provide servo information at other than fixed intervals with respect to data, such as within the data region itself. Such a scheme is disclosed in U.S. patent application Ser. No. 07/466,195, filed Jan. 1, 1990. In this case, the fields in FIG. 2A may be repositioned such that servo and recovery region 30 is split into separate recovery and servo regions with the recovery region containing fields 33 and 34 and the servo region containing field 35. The sector number and track number may then be determined in the same manner as with the sector for mat shown in FIG. 2A.

1B. NO-ID FBA DEDICATED SERVO SECTOR FORMAT

Figure 2B:
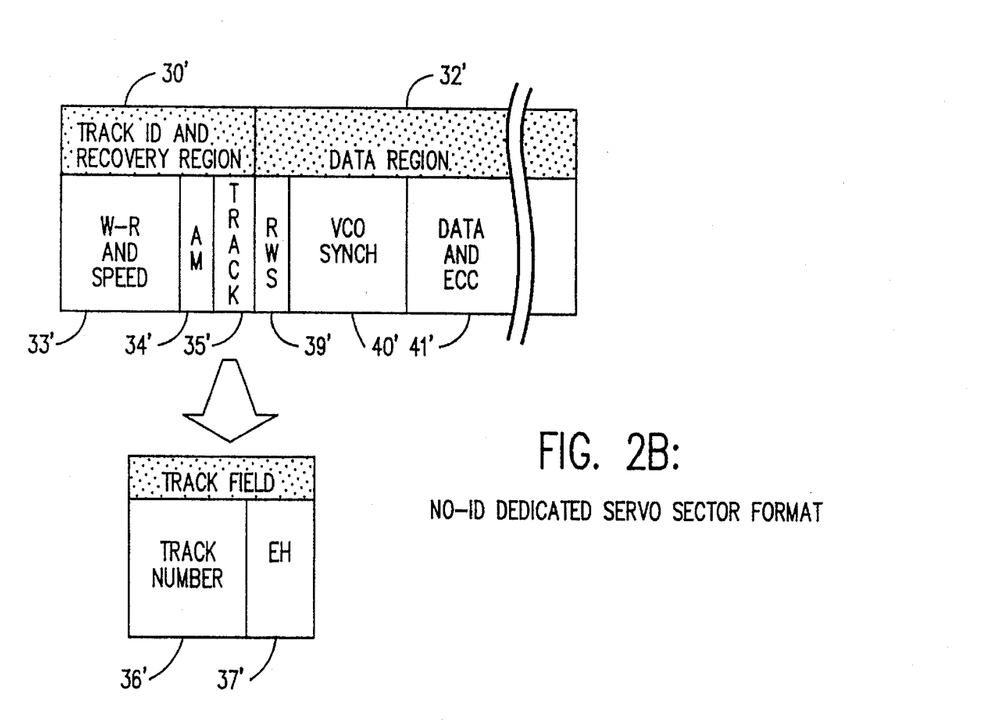
FIG. 2B is a schematic diagram illustrating a fixed block architecture dedicated servo sector format according to the present invention.

FIG. 2B illustrates in schematic diagram form an FBA data disk dedicated servo sector according to the present invention. Track ID and recovery region 30' is produced by combining aspects of prior art ID and recovery region 11' with the full track number. However, it contains no position error information analogous to that found in PES subfield 38. Track ID and recovery region 30' includes W-R and speed field 33', AM field 34' and track field 35'. Track field 35' itself includes track number subfield 36' and EH subfield 37'. Data region 32' assumes the same form as data region 32 in the sector servo format.

In operation, fields 33', 34', 39, 40', and 41' provide substantially the same functions as fields 13', 14', 19', 20', and 21' shown in prior art FIG. 1B and described previously. Fields 17' and 18' from prior art FIG. 1B are eliminated. Track number subfield 36' and EH subfield 37' are identical to fields 36 and 37 in FIG. 2A. The full track number is therefore provided in the same manner as for the sector servo format, including the alternative encodement schemes discussed in section IA. As with the sector servo format, the track number field must be accurately readable only when the head is on-track, since it is used only during read and write operations.

While FIG. 2B and the above description have focused on a dedicated servo data disk having the sector format of the present invention, it is to be noted that this sector format may also be applied to the dedicated servo disk itself. That is, track field 35' may be encoded on the dedicated servo disk. This configuration is not the preferred embodiment, as it requires more rigorous constraints on the system mechanics. However, it has the advantage of lower overhead since field 35' is not placed on the data surface, and thus may provide an attractive alternative that is within the scope and spirit of the present invention.

Dedicated servo systems record the head positioning information on a single magnetic recording surface, separate from the data surface(s). However, it is to be understood that there are many other types of servo systems, which for the purposes of the present invention function similarly to the dedicated servo system. These include systems such as: optical recording continuous groove systems, where the tracking information is provided by grooves in the substrate; buried servos, whether nagnetically, capacitively, or otherwise encoded; optical tracking servos, where the servo information is optically encoded on a data or servo surface; and baseplate reference servo systems, where the positioning information is provided by some external reference such as an optical encoder or a stepping motor. Finally, it is worthy of note that the present invention may be readily applied to systems combining aspects of sector servo and dedicated servo.

II. LOGICAL-TO-PHYSICAL SECTOR CONVERSION

According to the prior art, physical sectors are accessed by counting actual sectors. Physical sector 0 refers to sector 0, head 0, track 0. The number increases by counting sectors around a track, then switching heads, then tracks.

According to the present invention, physical sectors are accessed by counting start-of-sector indicating marks after a start-of-track indicating mark. A start of track indicating mark is encoded in a preselected servo region to provide a reference point from which to count sectors. A start-of-sector indicating mark is encoded in each sector. In operation, a requested physical sector is accessed by detecting the start-of-track indicating mark and then counting start-of-sector indicating marks until the appropriate sector is reached.

In the preferred embodiment of the present invention, the start of track indicating mark takes the form of a unique bit called an index mark, recorded in a preselected track number subfield 36. AM field 34 of each sector is used as the start-of-sector indicating mark. The servo system then counts AM fields after an index mark to locate a requested sector. No additional overhead is incurred, since the servo system must locate every AM field in order to read the PES subfield. Also, the scheme requires only a small counter, since the number of sectors per track is typically less than 64, and since the sector count is reset each time an index mark is detected.

There are a number of variations on the embodiment that serve to improve error tolerance where AM field 34 is missed due to a disk defect. First, the physical sector number may be encoded into track number field 36. Second, an open loop timer may be used to provide a timeout error if an address mark is not detected within a given time interval. Third, position fields may be counted in addition to AM fields.

III. LOOK-UP TABLE

Prior art disk drive implementations handle bad sectors via the sector ID region. According to the present invention in which the ID region has been eliminated, bad sectors are identified and mapped out of the data recording disk drive during logical-to-physical sector conversion using a look-up table. The table is created at format time, and consists of entries describing clusters of bad sectors (where a cluster is defined as a sequential group of physical bad sectors) by starting location and quantity. In operation, a requested logical sector location identifier is referenced into the table, and a corresponding entry is found describing an offset to the physical sector location identifier.

Figure 3:
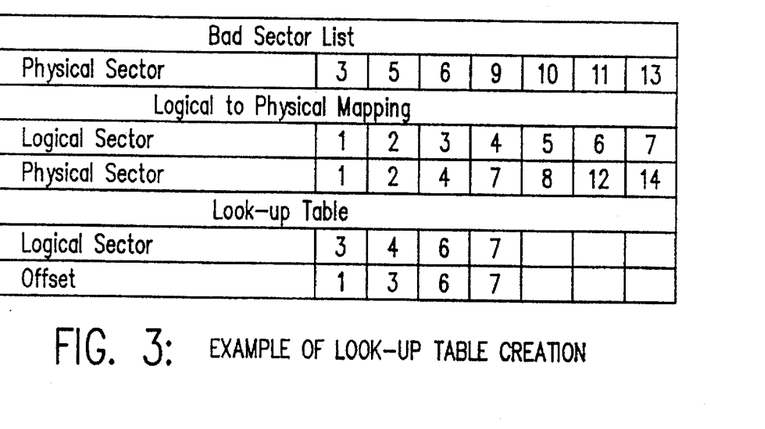
FIG. 3 is a table illustrating a bad sector list, a logical-to-physical mapping, and a look-up table according to the present invention.

More specifically, at format time, the data recording disk drive generates a list of physical sector location identifiers for the bad sectors in the disk drive. This list may be generated using any of the various techniques known in the art for locating bad sectors. The list is held in RAM and is used to construct the look-up table. FIG. 3 illustrates in tabular form an example of a bad sector list, a logical-to-physical mapping and a look-up table according to the preferred embodiment of the present invention. The bad sector list indicates that physical sectors 3, 5, 6, 9, 10, 11 and 13 were found to be bad at fore, at time. The logical-to-physical mapping shows the desired mapping to be achieved by the look-up table. Logical sector 1 will be found at physical sector 1; logical sector 2 will map to physical sector 2; logical sector 3 will map to physical sector 4 since physical sector 3 is defective, etc.

The look-up table shows the result of compressing the bad sector list in accordance with the present invention. Starting at logical sector 3, there is a cluster of 1 bad sector; thus, sectors 3 and beyond must be offset by 1 to map into the correct physical sector. Starting at logical sector 4, there is a cluster of 2 bad sectors; thus, sectors 4 and beyond must be offset by a total of 3 to map into the correct physical sector. Starting at logical sector 6, there is a cluster of 3 bad sectors; thus, sectors 6 and beyond must be offset by a total of 6 to map into the correct physical sector. Finally, starting at logical sector 7, there is a cluster of 1 bad sector; thus, sectors 7 and beyond must be offset by a total of 7 to map into the correct physical sector.

It is to be noted that the look-up table may be stored either on the boot track of the disk or in some non-volatile semiconductor memory in the data recording disk drive, such as EEPROM, FRAM, or PROM. The first column of the table must be wide enough to hold the largest physical sector number (24 bits is sufficient in most cases). The second column must be wide enough and the table long enough to hold the maximum number of bad sector clusters likely to be encountered (16 bits is sufficient in most cases).

Figure 4:
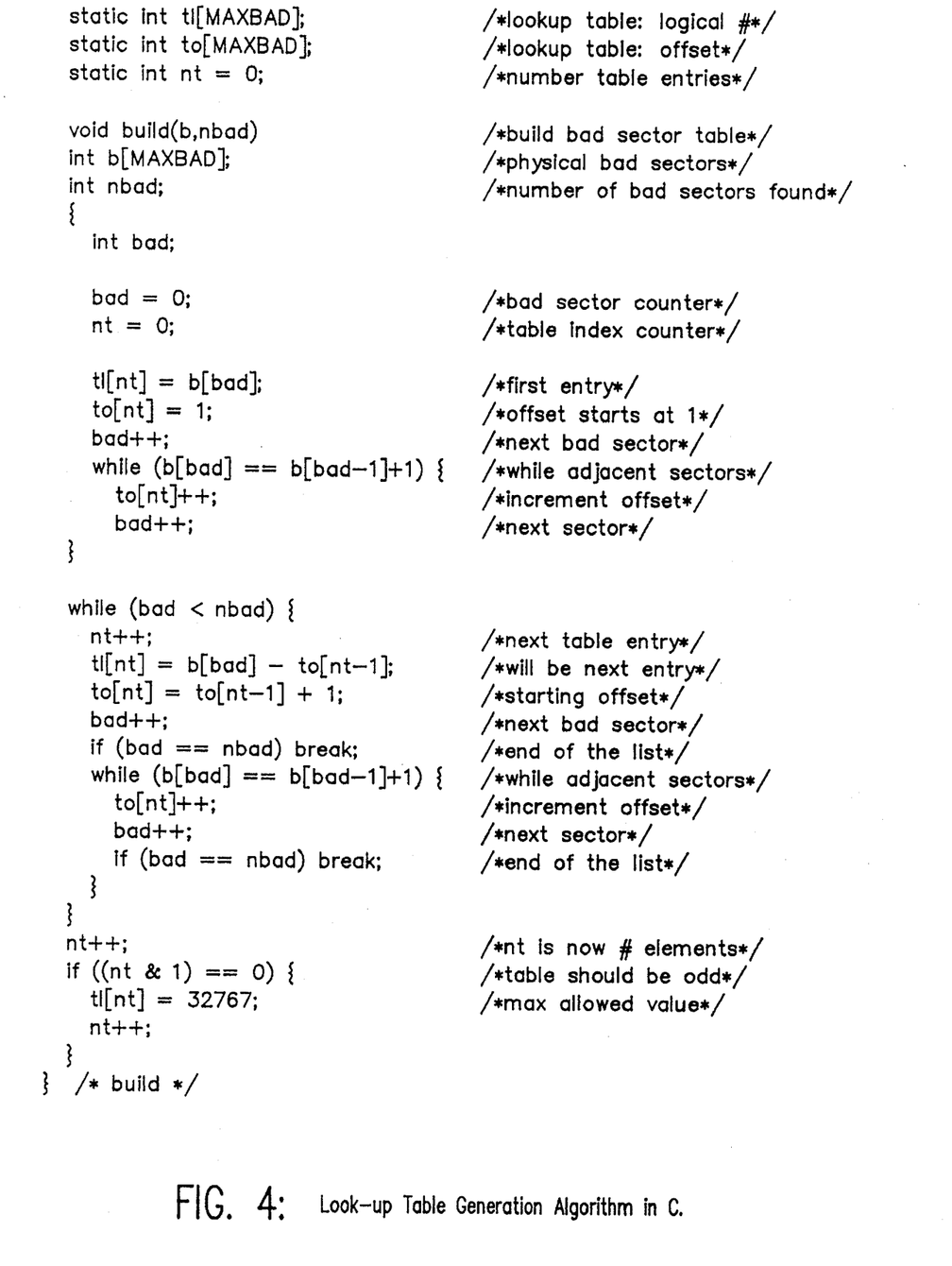
FIG. 4 is a C language procedure illustrating an algorithm for creating a look-up table according to the present invention.

FIG. 4 illustrates in algorithmic form a procedure for creating a look-up table according to the preferred embodiment of the present invention. The look-up table generation algorithm (shown in C programming language) processes the bad sector list as follows. First, the list of bad sectors is convened into the compact table representation. Then the first "while" loop computes the offset for the first block by determining its size (i.e. the number of contiguous bad sectors). Next, the second "while" loop performs the same operation for all the remaining blocks, determining each offset by adding the number of sectors in the block to the total number of bad sectors prior to the block. Finally, the look-up table is adjusted to contain an odd number of entries, for ease of access by a binary search look-up routine. Of course, many other search types are possible, the use of which would obviate this final step. Also, it is worthy of note that the look-up table generation algorithm may be executed against the entire bad sector list, or, where storage or processing constraints arise, may be executed in a piecewise fashion, so that each block of bad sectors is processed as it is located.

Figure 5:
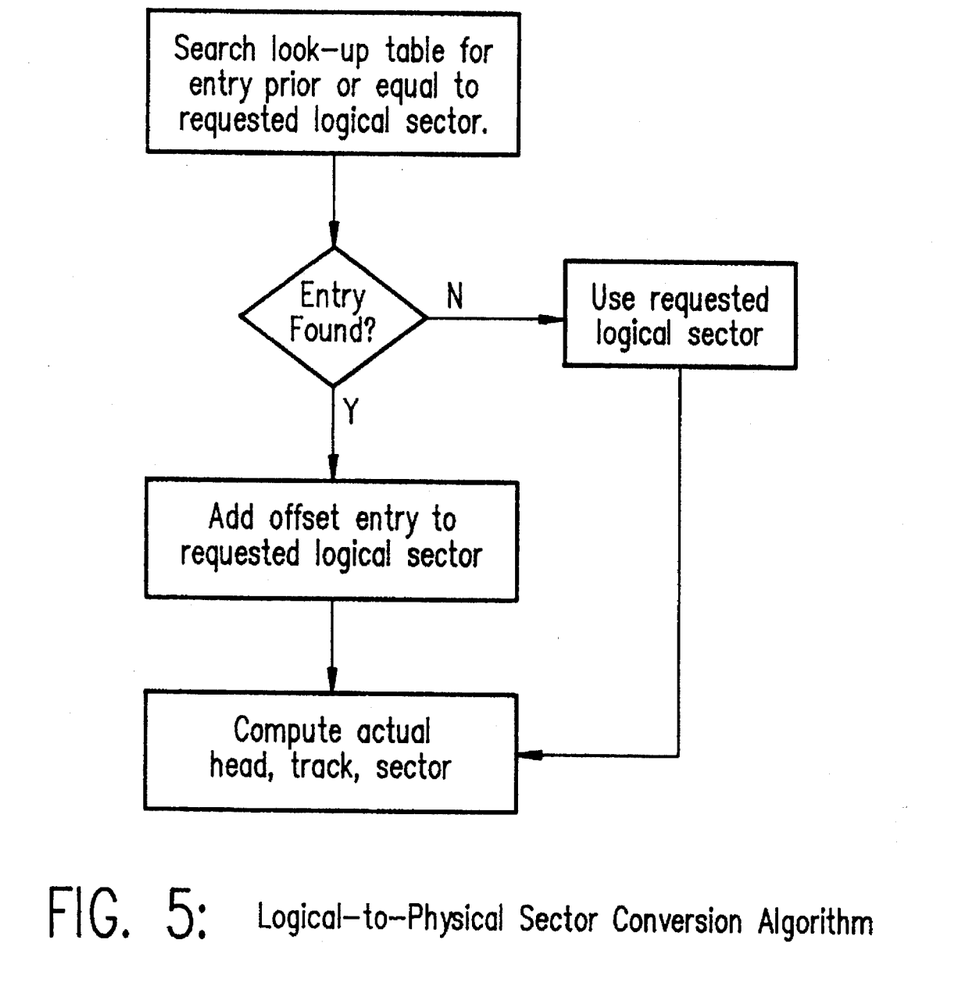
FIG. 5 is a flowchart illustrating an algorithm for performing logical-to-physical sector conversion according to the present invention.

FIG. 5 illustrates in flowchart form an algorithm for performing logical-to-physical sector conversion according to the preferred embodiment of the present invention. A READ or WRITE request, including a logical sector location identifier, is generated within the disk drive. A look-up table containing bad sector information and indices as described above is accessed and searched for the largest logical sector entry less than or equal to the requested logical sector. In the event no entry is found, the physical sector location identifier is equal to the logical sector location identifier, and the requested logical sector is accessed by computing head, track and sector number directly from the logical sector location identifier according to any of a variety of techniques well known to those skilled in the art.

If an entry is found in the look-up table, the corresponding offset is extracted from the look-up table and added to the logical sector location identifier of the requested logical sector. This sum, representing the physical sector location identifier, is used to compute the head, track and sector number corresponding to the requested logical sector.

In some implementations (e.g. SCSI), it may be desirable to allow for the relocation of bad sectors without resorting to a complete device format operation. This feature is implemented in conjunction with the present invention by allocating a set of sectors as spares prior to an initial format operation. The spares are treated as though they are bad sectors for purposes of constructing the logical-to-physical mapping table. The spare sectors are then distinguished from bad sectors, for instance by means of a flag in the mapping table or a separate list. Relocation of a bad sector is accomplished by logically substituting one of the spare sectors in its place, shifting all the intervening sectors by one logical sector location, updating the spare sector list to reflect the use of the spare sector, and re-constructing the logical-to-physical mapping table to reflect all the above changes.

A look-up table constructed according to the preferred embodiment of the present invention as described above has the advantageous effect of placing most of the computational overhead into building the table during the format operation, leaving a simple computation to support logical-to-physical mappings during seek operations. It is to be noted that the preferred embodiment look-up table approach is maximally effective when the total number of bad sectors in the data recording disk drive is small, since this keeps the overall table size small and thus keeps the worst-case binary search of the table short. For example, a disk drive having 240K sectors and 0.1% bad sectors would require a table having less then 1000 entries. The look-up table, in cooperation with the above-described algorithm, provides a scheme that efficiently catalogues bad sectors and enables rapid calculation of the correct physical sector corresponding to a requested logical sector.

Furthermore, the No-ID scheme of the present invention is particularly well suited for use with disk drives having different heads for reading and writing, such as magneto-resistive read heads, where the heads must be moved to slightly different radial positions for reading and writing (a practice known as micro-jog). With prior art fixed block architectures, writing a data field requires prior reading of the ID field. However, it is not possible to complete a micro-jog between the two fields, so a revolution is lost in performing the micro-jog. The No-ID format of the present invention eliminates this problem since it has no ID field to be read.

While the invention has been particularly described and illustrated with reference to a preferred embodiment, it will be understood by those skilled in the art that changes in the description or illustrations may be made with respect to form or detail without departing from the spirit and scope of the invention.

Having thus described the invention, what is claimed is:

1. A data recording disk having a pattern of radially spaced tracks and a plurality of circumferentially spaced angular sectors having prerecorded servo positioning information for identifying track and sector locations, each of the plurality of sectors including only a data region for recording user data and, preceding the data region in the circumferential direction, a servo-and-recovery region which provides the prerecorded servo positioning information to uniquely identify the sector and track, wherein the servo-and-recovery region includes a write-to-read-recovery and speed-compensation field, an error handling field, a positionerror-signal field, a start-of-sector indicating mark, and a track number field, but no data region identification (ID) field, wherein the data region includes, in sequence, a read-to-write-recovery and speed-compensation field and a synchronization field, and wherein one of the plurality of sectors also includes a start-of-track indicating mark.

2. The data recording disk as recited in claim 1, wherein the track number field includes a full track number prerecorded therein.

3. The data recording disk as recited in claim 1, wherein the start-of-track indicating mark is encoded in the track number field.

4. The data recording disk as recited in claim 1, wherein the start-of-sector indicating mark is an address mark located in the servo-and-recovery region, and wherein the address mark precedes the track number field in the circumferential direction.

5. The data recording disk as recited in claim 1, wherein the track number field includes a full sector number prerecorded therein.

6. The data recording disk as recited in claim 1 wherein some of the tracks also have servo-and-recovery regions located within some of the data regions.

7. A data recording disk having a plurality of tracks, each of the plurality of tracks having a start-of-track indicating mark and being divided into a number of data regions for recording user data and a number of servo-and-recovery regions, the servo-and-recovery regions containing a position-error-signal field, a servo-and-recovery region count mark, and a track number field, at least one of the data regions being split by a servo-and-recovery region, and wherein none of the plurality of tracks have, either within or outside the data regions and servo-and-recovery regions, identification (ID) regions containing information that uniquely identifies the data regions in the tracks.

8. The data recording disk as recited in claim 7 wherein the track number field includes a full track number prerecorded therein.

9. The data recording disk as recited in claim 7 wherein the start-of-track indicating mark is located within one of the servo-and-recovery regions.

10. The data recording disk as recited in claim 9 wherein the start-of-track indicating mark is encoded in the track number field.

11. The data recording disk as recited in claim 7 wherein the servo-and-recovery region count mark is a start-of-servo-and-recovery region mark.

12. The data recording disk as recited in claim 11 wherein the start-of-servo-and-recovery region mark is an address mark that precedes the track number field in the track.

13. The data recording disk as recited in claim 11 wherein the start-of-servo-and-recovery region mark is a servo-and-recovery region number.

14. The data recording disk as recited in claim 7 wherein the servo-and-recovery regions include a write-to-read recovery and speed-compensation field.

15. The data recording disk as recited in claim 7 wherein the data regions include, in sequence, a read-to-write recovery and speed-compensation field and a synchronization field.

* * * * *

(12) EX PARTE REEXAMINATION CERTIFICATE (6598th)
United States Patent
Best et al.

(10) Number: US 5,500,848 C1
(45) Certificate Issued: Jan. 6, 2009

(54) SECTOR SERVO DATA RECORDING DISK HAVING DATA REGIONS WITHOUT IDENTIFICATION (ID) FIELDS

(75) Inventors: John S. Best, San Jose, CA (US); Steven R. Hetzler, Sunnyvale, CA (US)

(73) Assignee: Hitachi Global Storage Technologies Netherlands B.V., Amsterdam (NL)

Reexamination Request:
No. 90/008,543, Mar. 16, 2007

Reexamination Certificate for:
Patent No.: 5,500,848
Issued: Mar. 19, 1996
Appl. No.: 08/082,826
Filed: Jun. 23, 1993

Related U.S. Application Data (63) Continuation of application No. 07/727,680, filed on Jul. 10, 1991, now abandoned.

(51) Int. Cl.
*G11B 20/18* (2006.01)
*G11B 20/12* (2006.01)
*G11B 27/30* (2006.01)

(52) U.S. Cl. .................. 369/275.3; 360/48; 360/75; 369/59.25

(58) Field of Classification Search .................. None
See application file for complete search history.

(56) References Cited

U.S. PATENT DOCUMENTS

| 4,823,212 A | 4/1989 | Knowles |
| 4,935,828 A | 6/1990 | Frissell |
| 5,255,136 A | 10/1993 | Machado |

FOREIGN PATENT DOCUMENTS

JP 06-119501 9/1989

OTHER PUBLICATIONS

Brett Smith, "Servo Zones Embedded in Data Tracks Solve Old, But Create New Problems," Computer Technology Review, Spring 1988, pp. 45–48.

*Primary Examiner*—Albert W. Paladini (57) ABSTRACT

A data recording disk file with a fixed block architecture sector format that eliminates the ID region. The servo region contains sector identification information in the form of a start-of-track indicating mark recorded in a selected sector of each track and a start-of-sector indicating mark recorded in each sector. A full track number identifier is encoded in the position field within the servo region of each sector. A look-up table is built at format time to map bad sectors out of the disk file. The table contains entries for each cluster of contiguous bad sectors, and is searched at runtime to provide conversion of logical sector location identifiers to physical sector location identifiers.

NO-ID DEDICATED SERVO SECTOR FORMAT

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–14 and 15 is confirmed.

* * * * *